United States Patent Office.

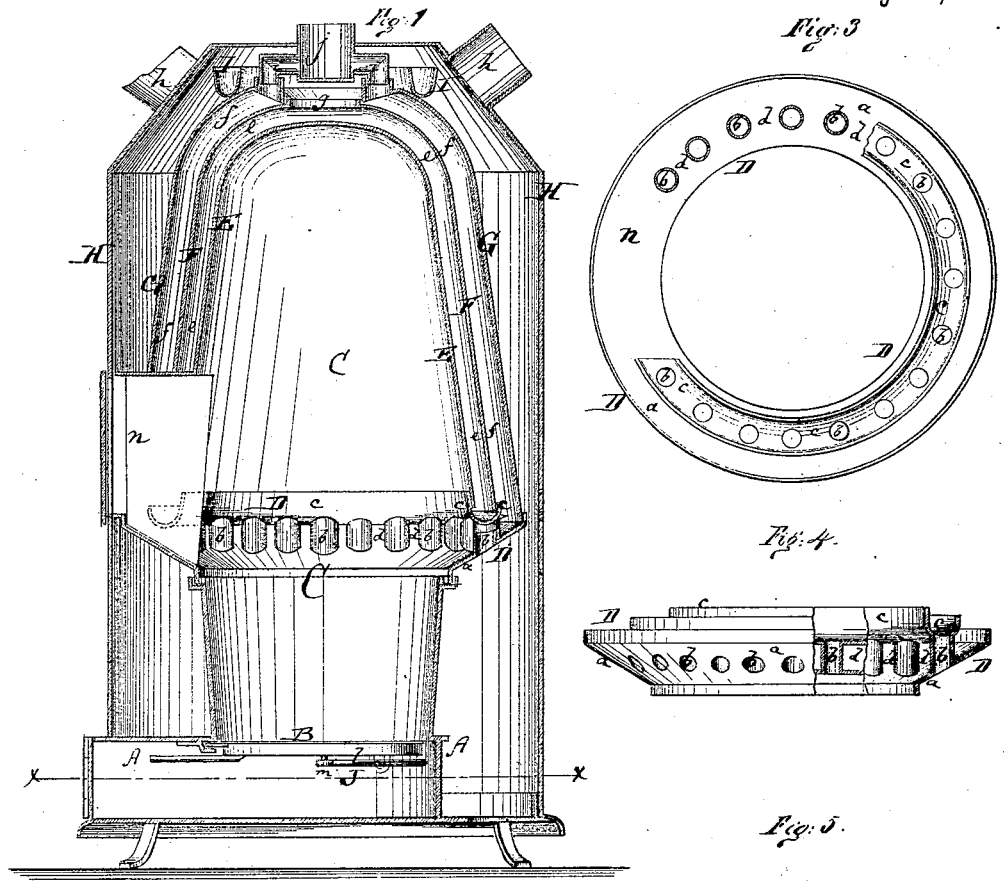

EDWARD WEBSTER, OF HARTFORD, CONNECTICUT.

Letters Patent No. 105,017, dated July 5, 1870.

HOT-AIR FURNACE.

The Schedule referred to in these Letters Patent and making part of the same.

*To all whom it may concern:*

Be it known that I, EDWARD WEBSTER, of Hartford, in the county of Hartford and State of Connecticut, have invented a new and improved Hot-air Furnace; and I do hereby declare that the following is a full, clear, and exact description thereof, which will enable others skilled in the art to make and use the same, reference being had to the accompanying drawing forming part of this specification, in which—

Figure 1 represents a vertical central section of my improved hot-air furnace.

Figure 2 is an inverted horizontal section of the same, taken on the plane of the line x x, fig. 1.

Figure 3 is a plan or top view, partly in section, of the ring which supports the three cupolas, and contains the separate air and smoke-passages.

Figure 4 is a side view, partly in section, of the said ring.

Figure 5 is a plan or top view of the furnace.

Similar letters of reference indicate corresponding parts.

This invention relates to a new hot-air furnace, which is so constructed as to provide for a complete circulation of the products of combustion, and also for a sufficient accommodation and circulation of fresh air to be heated.

The invention consists, first, in the arrangement above the fire-chamber, of three cupolas, of which one is within the other, for producing around and above the main combustion-chamber, two narrow passages, one for air, and one for the smoke.

The invention consists, also, in the use of a peculiar ring for supporting the three cupolas, the said ring having alternate horizontal and vertical apertures or conduits for smoke and air, respectively, to supply the aforesaid narrow passages.

A in the drawing represents the base,

B the grate, and

C the fire-chamber of my improved furnace.

The cylindrical or truncated conical inclosure of the fire-chamber supports on its upper end a ring, D, which is enlarged toward its upper end, so as to be of inverted conical form, as shown in fig. 4.

From the inclined base a of the ring D project upward a series of short vertical pipes, b b, which enter and support an annular trough, c, as shown.

Between the vertical pipes b b are horizontal passages d d.

By the ring D are supported three cupolas, E, F, and G, one within the other.

The innermost cupola, E, rests upon the inner part of the trough c, while the central cupola, F, is supported by the outer part of the trough c, and the outer cupola, G, by the outer and highest part of the ring D, as shown in fig. 1.

There are thus two narrow spaces, e and f, formed between the cupolas.

The inner space, e, receives fresh air from below through the pipes b, and discharges the same in a heated state through a central opening, g, on top, into an outer case, H, that surrounds the entire furnace, whence it can be conducted to suitable apartments by pipes h h.

The outer space, f, receives the smoke through the horizontal passages d, from the fire-chamber, and heats, therefore, both the plates F and G, and the air in contact therewith.

In the space f the smoke is spread, to give off nearly the entire heat, and to consequently heat the air in the space E and case H.

From the space f the smoke is, by a number of pipes, i i, conducted to a central smoke-flue, j.

The air in the space e is thoroughly heated, not only by the heat in the combustion-chamber, but also by that in the space f, and is then once more heated in the case H.

Upon the outer cupola G is or may be supported an annular evaporating pan, I, which surrounds and clears the central aperture g and pipes i j, and still contains a proportionately large amount of heating-surface.

The circular grate B is pivoted by a pin, m, upon the forward projecting arm l of a pivoted curved frame or bar, J, which frame or bar is so shaped as to fit under the rim of the grate, clearing thereby the grate-bars, and permitting the raking of the same.

Heretofore the dumping-frames, which support pivoted grates, were so made as to extend across the grate-bars, and they tended, therefore, to seriously interfere with the operation of raking the fire.

The opening for the fire-door n is provided either through the cupolas and ring D or through the lower part of the case C.

Having thus described my invention,

I claim as new and desire to secure by Letters Patent—

1. The three cupolas E, F, and G, arranged above the fire-chamber, for the purpose of forming the air and smoke-passages e and f, substantially as herein shown and described.

2. The ring D, containing the alternate vertical and horizontal apertures b b, and the trough c, for supporting and supplying the cupolas E, F, and G, as set forth.

EDWARD WEBSTER.

Witnesses:
 EDWIN E. MARVIN,
 WM. W. HYDE.